No. 822,804. PATENTED JUNE 5, 1906.
H. M. WILLIS.
WEIGHING INSTRUMENT.
APPLICATION FILED AUG. 25, 1904.
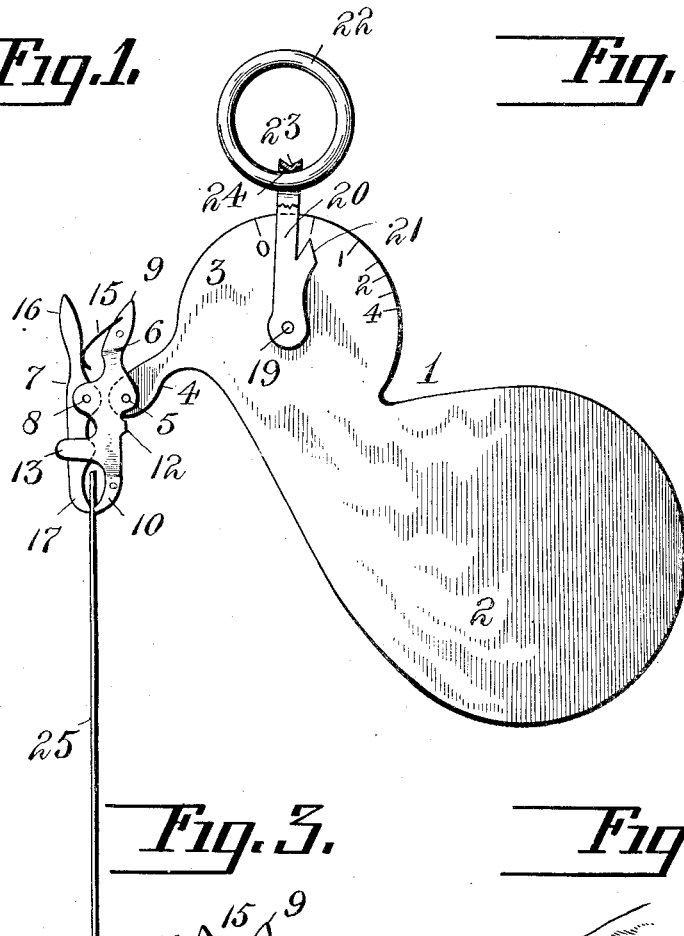
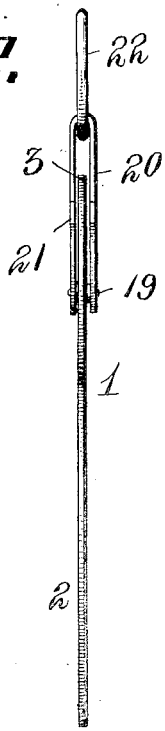
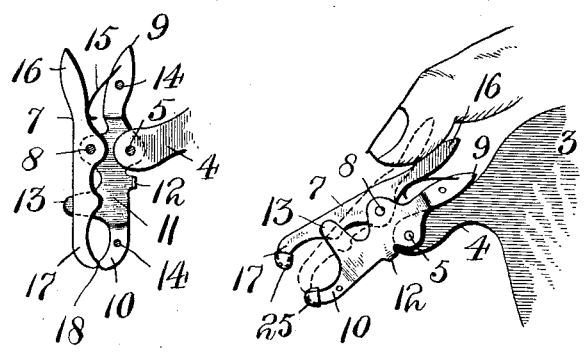
WITNESSES:
INVENTOR:
Henry M. Willis
BY
Chas. McC. Chapman
ATTORNEY

UNITED STATES PATENT OFFICE.

HENRY M. WILLIS, OF EAST WILLISTON, NEW YORK.

WEIGHING INSTRUMENT.

No. 822,804.  Specification of Letters Patent.  Patented June 5, 1906.

Application filed August 25, 1904. Serial No. 222,051.

*To all whom it may concern:*

Be it known that I, HENRY M. WILLIS, a citizen of the United States, residing in East Williston, Nassau county, and State of New York, have invented a new and useful Improvement in Weighing Instruments, of which the following is a description.

This invention relates, generally speaking, to weighing instruments, and particularly to scales for weighing light articles, such as letters.

An object of my invention is to produce a letter-scale which will be quite accurate, simple in construction, and cheap of production.

Another object of my invention is to provide a letter-scale of a construction such that it may be used as an effective advertising medium.

With the above objects in view, together with others which will be disclosed and readily understood during the course of this description, my invention consists in the parts, features, and combinations of elements hereinafter described and claimed.

Primarily it should be understood that my scale may be made of any material found suitable and desirable for the purpose; but, preferably, I make the same of aluminium, inasmuch as this metal is light, strong, susceptible of manipulation for the purposes of the scale, and is suitable for the application of an advertisement and its use as an advertising medium. It will be understood, however, that I do not purpose confining my invention to its production from aluminium.

In the drawings accompanying this description, Figure 1 shows my scale in its preferred form in front elevation. Fig. 2 is a right-hand edge view of Fig. 1. Fig. 3 is a detail view, partly in section, showing the clamp or gripping-jaws for suspending the weight of the article to be weighed, and Fig. 4 is a detail in elevation showing the manner in which the pivoted clamp is manipulated to open the same for insertion of an article to be weighed.

Referring to the drawings, the numeral 1 indicates, generally, the body of the scale, the same constituting the balance. The weight of the balance resides in the enlarged portion 2, which, as shown, is given a symmetrical rounded form. The head of the balance is indicated by 3 and is given a semicircular form around its top and one edge. Around the edge of this semicircular portion are placed the calibrations to indicate the weight of the article suspended. At the rear edge or at a suitable point opposite the calibrations the head of the balance is provided with the arm 4, the same being preferably made integral therewith, although obviously it may be made separate and applied thereto by soldering or other suitable means. To the outer end of the arm 4 is pivoted at 5 the clamping, holding, or other suspending means. Preferably I employ a clamp consisting of the levers 6 and 7 pivoted together at 8. The lever 6 is made in two sections, each of which is composed of the handle 9 at one end and the clamping-jaw 10 at the other end. Intermediate its ends each jaw is provided with the offset portion 11, having a perforation for the reception of the pivot-pin 5, the offset portions of the two parts receiving between them the arm 4. Each part of the lever 6 is provided with an inturned lug 12 and a laterally-extending guiding-finger 13, and the handle 9 and jaw 10 are provided with the rivet-holes 14. The handle 9 is also provided with an inclined cut or recess for the reception of the flat end of a curved spring 15, the outer end of which bears upon the handle 16 of the other lever 7. This lever 7 is preferably made of a single piece of material, and its end opposite the handle is formed into the complemental clamping-jaw 17. When the clamp is put together, the lever 7 is placed between the two sections or parts of the lever 6 and the latter are riveted together by means of pins entering the holes 14, or said two parts may be soldered, brazed, or otherwise held together. The two lugs 12 will then coöperate to form a brace or stop which will engage the lower edge of the arm 4 for the purpose of limiting the movement of the clamp in that direction. The guiding-fingers 13 will receive between them the upper portion of the jaw 17, which latter will be prevented thereby from having lateral movement relatively to the lever 6 or any twisting movement on the pivot 8, the jaw 17 thus always being held properly in contact with its opposing jaw 10. The fingers 13 are sufficiently extensive to always guide and maintain the lever 7 in its proper operative plane. (See Fig. 4.) The spring 15 normally holds the jaws 10 and 17 in gripping-contact, and the ends of these jaws are turned toward each other and formed with contact-points 18, so as to firmly and effectively clamp and hold the article to be weighed.

The balance has pivotally secured thereto substantially in the center of its head 3, as at 19, the yoke 20, which embraces said head, as shown in Fig. 2. The pivotal action between the yoke 20 and the head of the balance or beam is quite free or easy, as will be readily understood. The front bar of the yoke 20 is provided with the indicator or finger 21, which coöperates with the calibrations to indicate the weight of the article held by the jaws. To suspend the scale and enable it to perform its function by having absolute freedom of movement, the yoke is suspended by the ring 22, which is passed between the bars of the yoke and is located in the crotch of the latter. In order to reduce friction and provide a pivotal connection between the ring and the yoke, the latter is depressed at 23 or otherwise provided in its crotch with a pivotal point or projection 24 to engage the inner surface of the ring. This means for suspending the scale is essential to its proper operation, inasmuch as a rigid connection between the yoke and ring would render it ineffective and without function as a scale.

It is intended that the body portion 2 shall have applied thereto the name of the owner, his business, &c., or any other indicia constituting an advertisement, and it will readily be understood that both the back and the front may have applied thereto any design or any character calculated to advertise one's wares or business.

From the above detail description the operation will be readily understood, it being borne in mind that the balance is so proportioned or weighted that when suspended by taking hold of the ring 22 the same will hang with the part 2 directly below the pivot 19 and the yoke 20 will stand vertically with its indicator 2 at zero. In order to place an article to be weighed in the clamp, the head 3 may be held between the thumb and second finger and the first finger reaching over into engagement with the handle 16 of the lever 7, thus forcing the handle 9 of the lever 6 into engagement with the upper edge of the arm 4. (See Fig. 4.) Then pressure upon the handle 16 will separate jaw 17 from jaw 10 and compress the spring 15. The letter or other article may now be placed between the jaws 10 and 17, the handle 16 released, and the scale suspended by the ring. The clamp will firmly grip and hold the article and assume the vertical position shown in Fig. 1, with the balance in the position shown and the indicator 21 pointing the weight of the article in the calibrations.

It may be that from constant use the ends of the two gripping-jaws 10 and 17 may become slightly worn, and thereby reduce their efficiency as gripping or holding jaws. To avoid this, or when such a thing occurs, the ends of said jaws may be provided with caps or covers 25, Fig. 4, to create friction and prevent wear on the said ends. These caps or covers may be made of any frictional material, hard or soft, leather, rubber, and felt having been found efficient. These caps or covers may be secured to the ends of the jaws in any suitable manner.

From the above description it will be seen that I have produced a simple, cheap, and effective weighing instrument for weighing letters and other light articles, that I have produced a weighing instrument which can be made of light metals, precious, or of other character, and that I have produced a weighing instrument which is highly effective as an advertising medium.

Having thus described my invention, what I claim, and desire to secure by Letters Patent, is—

1. A weighing instrument comprising a balance having calibrations disposed thereon, and a laterally-extending arm; in combination with means for pivotally supporting said balance; a pointer coöperating with said calibrations; a spring-clamp pivoted to said arm; said clamp and arm having means between them for limiting the movement of the former relatively to the balance in two directions in the plane of the surface of the latter.

2. A weighing instrument comprising a balance having calibrations disposed thereon, and a laterally-extending arm; in combination with means for pivotally supporting said balance; a pointer coöperating with said calibrations; and a spring-clamp, pivoted to said arm, having means coöperating with said arm for limiting the movement of said clamp relatively to said balance in two directions in the plane of the surface of the latter.

3. A weighing instrument comprising a balance having calibrations disposed thereon, and a laterally-extending arm; in combination with means for supporting said balance pivotally connected thereto and having a pointer coöperating with said calibrations; and a pivotally-supported spring-clamp, having means coöperating with said arm, for limiting the movement of said clamp relatively to said balance in two directions in the plane of the surface of the latter.

4. A weighing instrument comprising a balance having a head portion of semicircular form provided with calibrations, said head also having a laterally-extending arm; in combination with means for pivotally supporting said balance having a pointer coöperating with said calibrations; and a spring-clamp, pivoted to said arm, having means coöperating with the latter for limiting its movement relatively to the balance in two directions in the plane of the surface of the latter.

5. A weighing instrument comprising a balance having a weighted body portion; a head portion of semicircular form provided with calibrations and having a laterally-extending arm; in combination with means for pivotally supporting the balance having a pointer coöperating with said calibrations;

and a clamp, pivoted to said arm, having means coöperating with the latter for limiting its movement relatively to the balance in two directions in the plane of the surface of the latter.

6. A weighing instrument comprising a balance having a laterally-extending arm and means affording a pivotal support; in combination with a clamp comprising a pair of pivotally-connected levers, one of the levers being in two sections and each of which latter has an offset portion embracing the said arm and pivotally connected thereto; and means for causing the levers to clamp a given article.

7. A weighing instrument comprising a balance having a laterally-extending arm and means affording a pivotal support; in combination with a clamp composed of two principal parts and one of which parts is made in two sections each having an offset portion embracing the said arm and pivotally connected thereto; means for connecting the two clamp parts; and means for holding the clamp parts yieldingly together.

8. A weighing instrument comprising a balance having a laterally-extending arm and means affording a pivotal support; in combination with a clamping device pivotally supported on said arm and comprising a pair of pivotally-connected spring-controlled clamping-jaws; the two jaws having means between their pivot and clamping ends for preventing lateral or twisting action of the same relatively at the pivot.

In testimony whereof I have hereunto signed my name in the presence of two subscribing witnesses.

HENRY M. WILLIS.

Witnesses:
DAVID A. HOWELL,
M. HERSKOVITZ.